United States Patent [19]
Ono et al.

[11] Patent Number: 5,518,112
[45] Date of Patent: May 21, 1996

[54] SOFTWARE DISK HOLDER AND ASSEMBLY OF DISK CASES THEREWITH

[75] Inventors: Masuo Ono, Fuji; Shigeo Sano, Fujimiya, both of Japan

[73] Assignee: Hatakeyama Seisakusho CO., Ltd., Shizuoka, Japan

[21] Appl. No.: 324,667

[22] Filed: Oct. 18, 1994

[30] Foreign Application Priority Data

Oct. 28, 1993 [JP] Japan ................................ 5-292589

[51] Int. Cl.$^6$ ................................ B65D 85/57
[52] U.S. Cl. ................................ 206/308.3; 206/308.1; 206/425; 211/40; 220/23.4; 312/111
[58] Field of Search ................. 206/308.1–308.3, 206/309–312, 425; 312/111; 220/23.4; 211/40

[56] References Cited

U.S. PATENT DOCUMENTS

| | | | |
|---|---|---|---|
| 4,401,216 | 8/1983 | Koch | 206/308.3 X |
| 4,702,369 | 10/1987 | Philosophe | 206/312 |
| 5,191,983 | 3/1993 | Hardy | 206/308.1 X |
| 5,293,992 | 3/1994 | Warner | 206/308.1 |
| 5,360,107 | 11/1994 | Chasin et al. | 206/308.1 X |
| 5,392,906 | 2/1995 | Taniyima | 206/308.1 |
| 5,392,913 | 2/1995 | Merrick | 206/308.1 |

*Primary Examiner*—Bryon P. Gehman
*Attorney, Agent, or Firm*—Wenderoth, Lind & Ponack

[57] ABSTRACT

A software disk holder holds in a coupled state a plurality of software disk cases each having a case body and a lid such that the lid of each case can be opened and closed. Holder plates are each interposed between an upper and a lower software disk case. Each plate has upper case coupling structure to be coupled to the case body of an upper software disk case and lower case coupling structure to be coupled to the lid of a lower software disk case.

13 Claims, 6 Drawing Sheets

SOFTWARE DISK HOLDER AND ASSEMBLY OF DISK CASES THEREWITH

BACKGROUND OF THE INVENTION

1. Field of the Invention

This invention relates to a software disk holder which can hold a plurality of software disk cases accommodating software disks, such as optical disks or magnetic disks, in an overlapped state or in a planar state such that the lid of each case can be opened and closed.

2. Prior Art

Compact disks (CD) such as optical disks and magnetic disks and also magnetic tapes such as cassette tapes (hereinafter referred to as software disks) are provided for sale in a state accommodated in respective exclusive cases. Also, case boxes which can store a plurality of such software disk cases are sold.

The software disk purchaser is required to obtain case boxes in correspondence to the amount of required storage of software disks and to collect the disks in such boxes.

Such case boxes can accommodate a plurality of software disk cases in an arranged form. However, such case boxes lack a function of arranging individual software disks in agreement with predetermined conditions, maneuverability when carrying them and instant response when using them (i.e., removing a software disk from and replacing it in storage). Further, such case boxes impose restrictions on the amount of disks that can be accommodated.

Similar deficiencies are prone to disk books which accommodate software disks in file form.

SUMMARY OF THE INVENTION

The object of the invention is to provide a software disk holder, which is independent of the use of any such box or the like and can effectively solve the above problems.

To attain this object, the software disk holder according to the invention comprises holder plates each to be interposed between an upper and a lower software disk case, each holder plate having upper and lower case coupling means to be coupled to the case body and the lid, respectively, of the upper and lower software disk cases. A plurality of software disk cases thus can be coupled together in a stack and overlapped form such that each of them can be opened and closed in their mutually coupled state.

The software disk holder according to a different mode of the invention comprises holder plates each to be overlapped over the bottom of a respective software disk case, each holder plate having upper case coupling means to be coupled to and un-coupled from the case body of the upper software disk case, first side plate coupling means to be coupled to and un-coupled from the holder plate for a front or rear adjacent software disk case, and second side plate coupling means to be coupled to and un-coupled from the holder plate for a left or right adjacent software disk case. A plurality of software disk cases thus can be coupled together in a planar form such that each of them can be opened and closed in their mutually coupled state.

The upper and lower case coupling means and the first and second side plate coupling means may be in the form of an engagement structure constituted by holes or recesses and protuberances, an engagement structure constituted by protuberances and hooks, etc. These engagement structures are well known in the art and are provided on the overlap surfaces or the edges of the holder plate and the software disk case.

According to the invention, a plurality of software disk cases can be coupled together in an overlapped state together with the holder plates, each interposed between adjacent cases. While the software disk cases are coupled together with the holder plates in the overlapped state, each of the overlapped cases can be opened and closed together with the associated holder plates to remove and then to reinsert the respective software disk.

In addition, a plurality of software disk cases can be coupled together in a planar state via the software disk holder. While the software disk cases are coupled together in a planar state via the software disk holder, the lid of each of the cases coupled in the planar state can be opened and closed to remove and then to reinsert the respective software disk.

Thus, by using the software disk holder according to the invention the software disk cases may be readily coupled together either in the overlapped state or in the planar state, depending on an increase of and without being restricted by the number of software disk cases. Further, a desired number of software disk cases may be carried, and it is possible to remove and then to reinsert a particular software disk quickly.

It is thus possible to improve the deficiencies in the prior art box type or file type software disk accommodation structures and to provide a new software disk case arranging, holding and carrying means without use of any box or file.

DETAILED DESCRIPTION OF THE PREFERRED EMBODIMENTS

Preferred embodiments of the invention will now be described with reference to FIGS. 1 to 12.

According to the invention, two different types of software disk holders are provided. One type of software disk holder can accommodate a plurality of software disk cases of optical or magnetic disks or magnetic tapes in an overlapped state such that the lid of each case can be opened and closed. The other type of software disk holder can accommodate a plurality of software disk cases in a planar state such that the lid of each case can be opened and closed.

Figure 12:
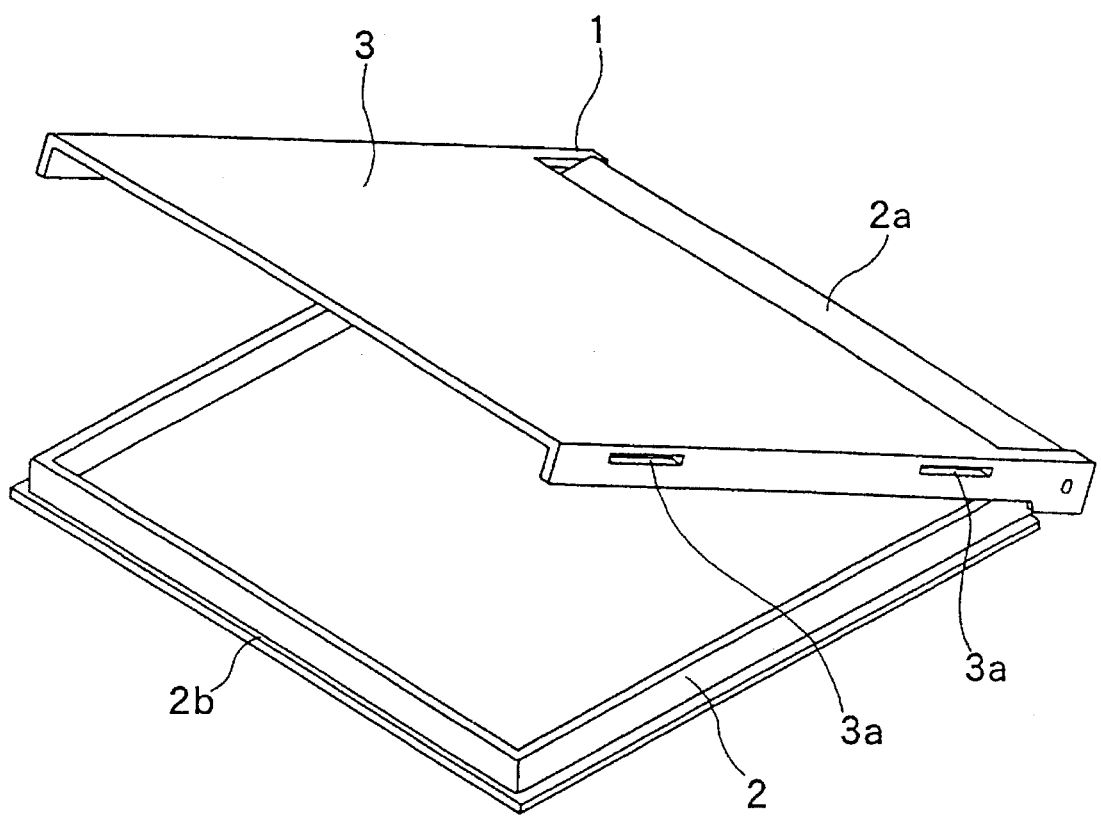
FIG. 12 is a perspective view showing an example of software disk case.

The former software disk holder, as shown in FIGS. 1 to 8, comprises a plurality of holder plates 4 which are each to be interposed between opposite side software disk cases 1. Each holder plate 4 has upper and lower case coupling means 5 and 6. The upper case coupling means 5 is coupled to a case body 2 of a software disk case 1 which is held on the upper side of the plate 4. The lower case coupling means 6 is coupled to a lid 3 of a software disk case 1 which is held on the lower side of the plate 4. The lid 3, as shown in FIG. 12, is hinged to one end of the case body 2.

The upper case coupling means 5 permits the case body 2 of a software disk case 1 overlapped over the upper side of the holder plate 4 to be coupled to the plate 4 in the overlapped state thereover. Likewise, the lower case coupling mean 6 permits the lid 3 of a software case 1 overlapped over the lower side of the holder plate 4 to be coupled to the plate 4 in the overlapped state thereover. The coupling means 5 and 6 are provided on the overlap plane of the plate 4 or the edges of the overlap plane, i.e., the four sides of the plate 4.

In the illustrated embodiment, the upper case coupling means 5 is provided on two opposed sides of the holder plate 4 such that it can be coupled to and uncoupled from two opposed sides of the case body 2 of the software disk case 1 overlapped over the upper side of the plate 4. The lower case coupling means 6, on the other hand, is provided on the other two opposed sides of the plate 4 such that it can be coupled to and un-coupled from the other two opposed sides of the lid 3 of the software disk case 1 overstapped over the lower side of the plate 4.

FIGS. 2 to 5 show specific examples of the upper and lower case coupling means 5 and 6. As shown, the upper case coupling means 5 includes lock pawls 5a provided on two opposed sides of the holder plate 4, for instance the front and rear edges thereof (i.e., the hinged edge and the edge opposite the hinged edge). The lock pawls 5a can be coupled to and un-coupled from the front and rear edges of the case body 2. The lower case coupling means 6 includes lock pawls 6a provided on the other two opposed sides of the plate 4, for instance the left and right side edges thereof. The lock pawls 6a can be coupled to and decoupled from the left and right edges of the lid 3.

Figure 7:
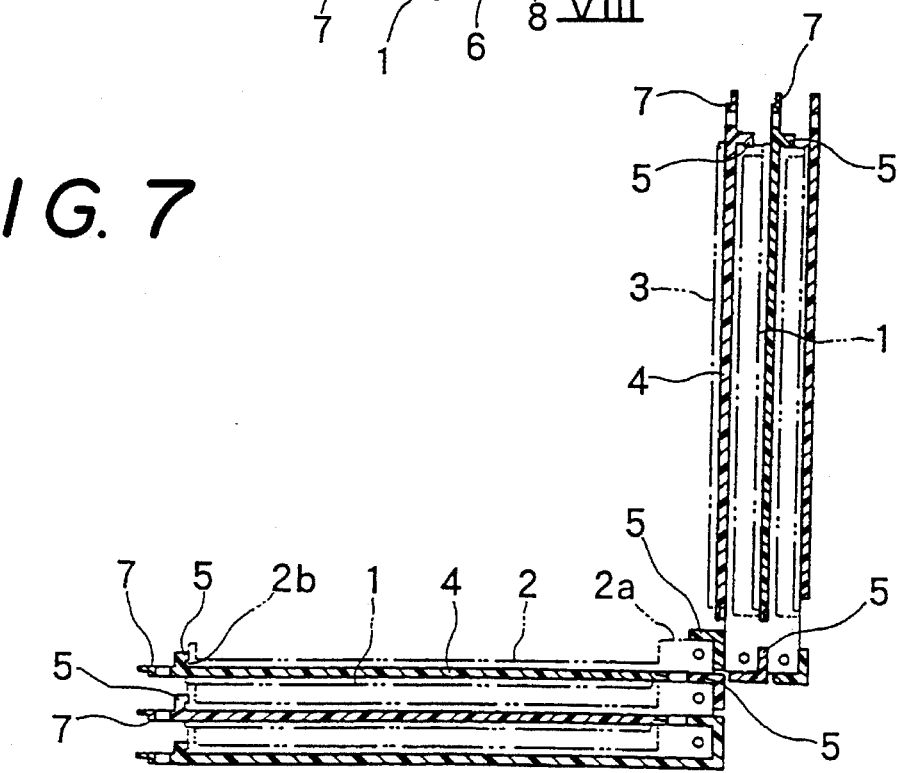
FIG. 7 is a sectional view taken along line VII—VII in FIG. 6.
Figure 8:
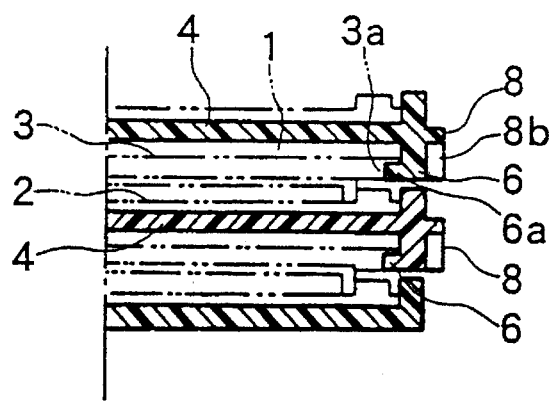
FIG. 8 is a sectional view taken along line VIII—VIII in FIG. 6.

As shown in FIGS. 7 and 8, the rear lock pawls 5a can be coupled to the rear edge 2a of the top of the case body 2 such as to embrace the rear end thereof. The other lock pawls 5a can be coupled to and un-coupled from a front end extension 2b slightly extending from the front end of the case body 2.

The lock pawls 6a can coupled to and uncoupled from holes 3a provided in the lid 3 of the lower software disk case 1 adjacent the left and right sides thereof.

The above upper and lower case coupling means 5 and 6 adopt a coupling structure which conforms to the structure of a commercially available compact optical disk case. However, this is by no means limitative, and it is possible to adopt various different types of coupling structures, for instance one with holes and protuberances or one with protuberances and hooks.

Figure 1:
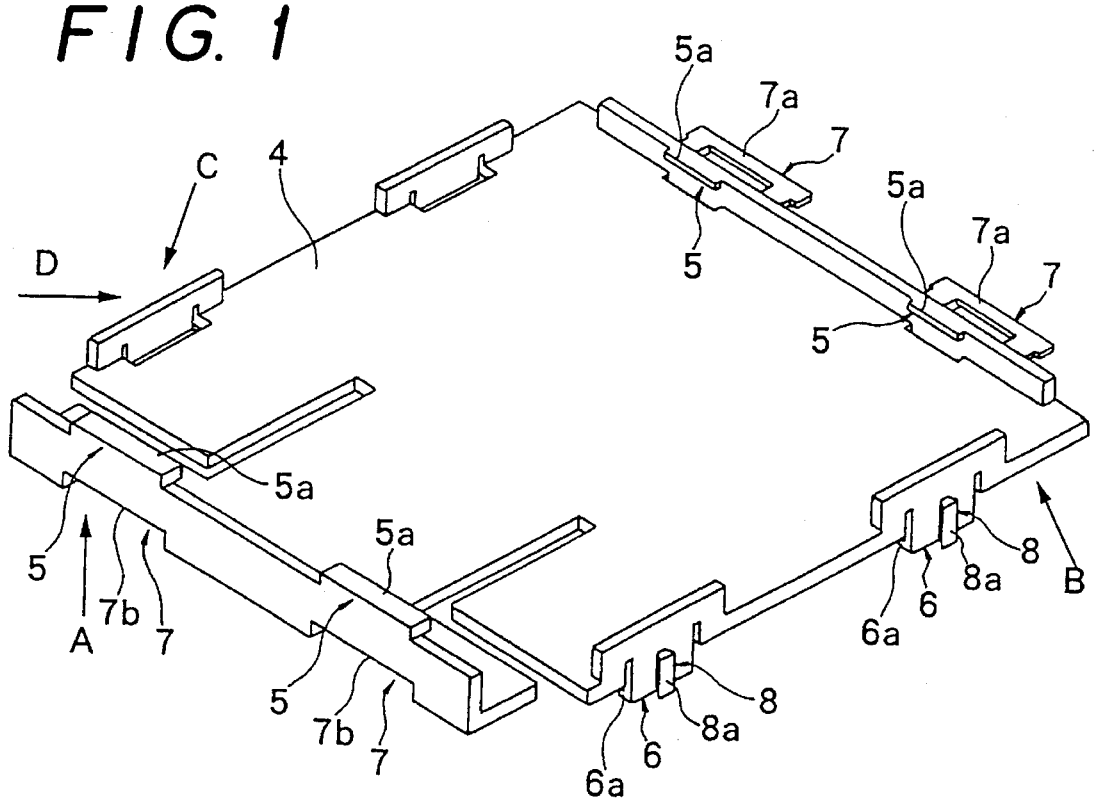
FIG. 1 is a perspective view showing a soft disk holder embodying the invention.
Figure 2:
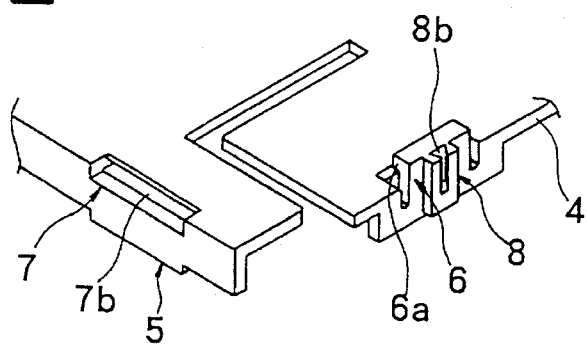
FIG. 2 is a fragmentary perspective view showing the same soft disk holder taken from the bottom (i.e., in the direction of arrow A in FIG. 1)
Figure 3:
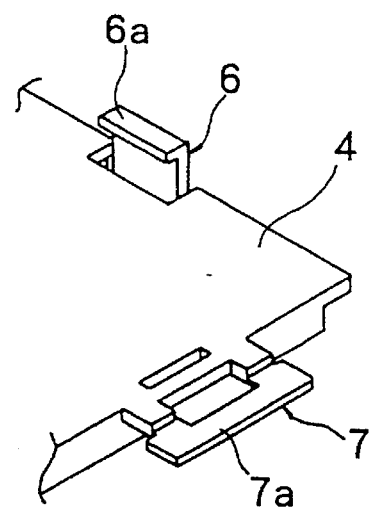
FIG. 3 is a fragmentary perspective view showing the same holder taken from the bottom (i.e., in the direction of arrow B in FIG. 1)
Figure 4:
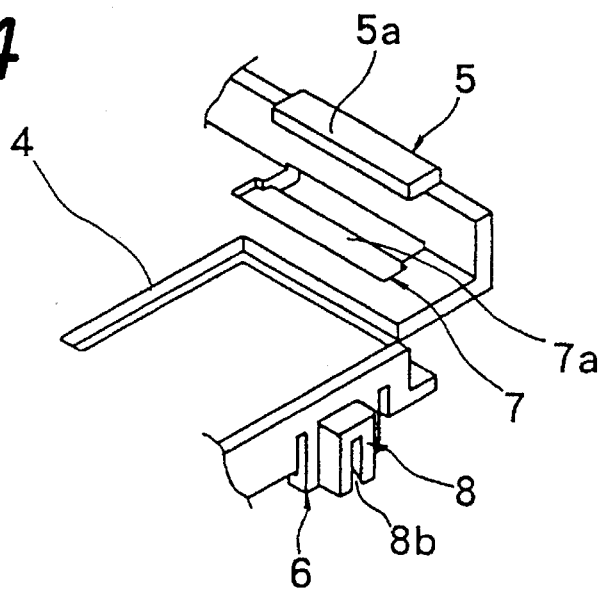
FIG. 4 is a fragmentary perspective view showing the same holder taken in the direction of arrow C in FIG. 1.
Figure 5:
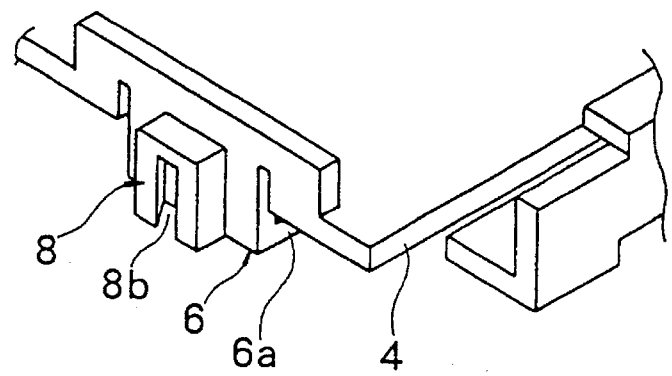
FIG. 5 is a fragmentary perspective view showing the same holder taken in the direction of arrow D in FIG. 1.
Figure 6:
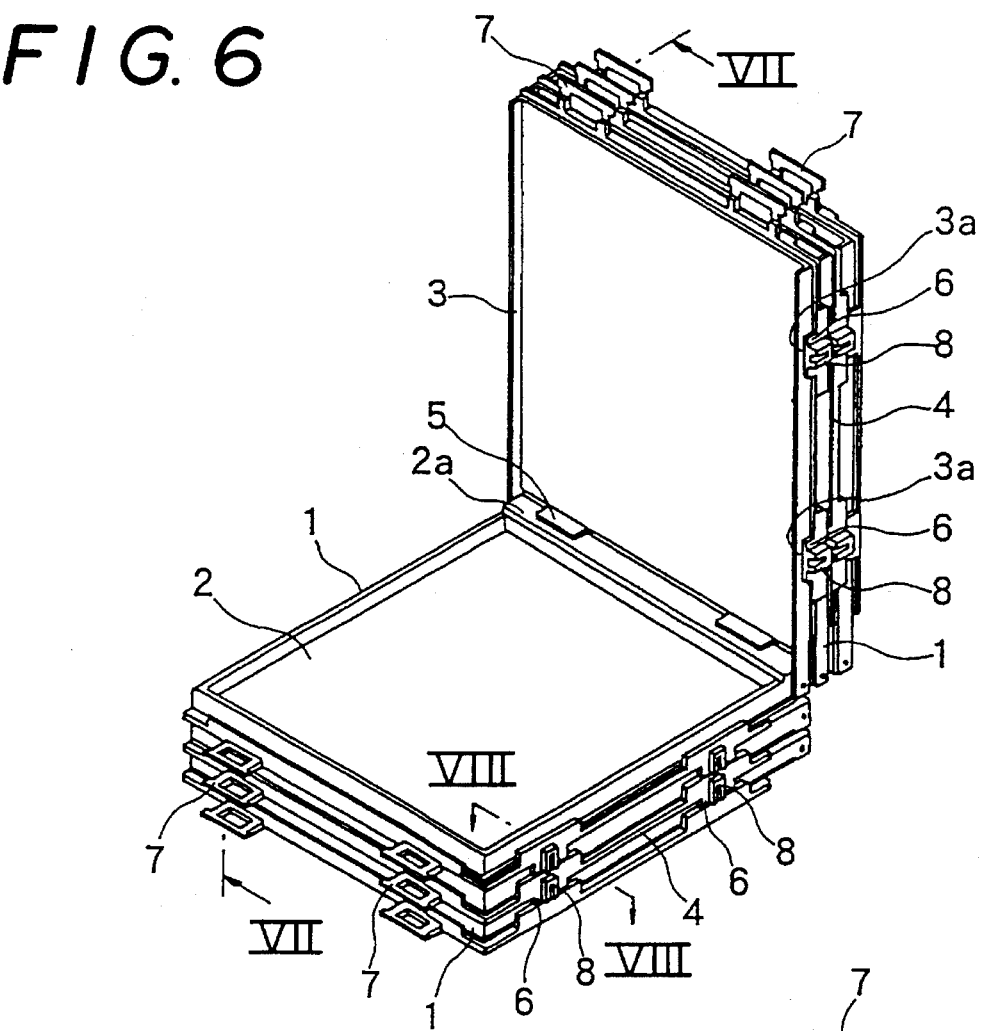
FIG. 6 is a perspective view showing the same holder holding a plurality of software disk cases in an overlapped state.

As shown in FIG. 6, with the holder plate 4 provided between an upper and a lower software disk case 1, the upper case coupling means 5 coupled to the case body 2 of the upper software disk case and the lower case coupling means 6 coupled to the lid 3 of the lower software disk case 1, a plurality of software disk cases 1 are coupled together in an overlapped state by holder plates 4 each interposed between cases 1. In addition, the lid 3 of each software disk case 1 can be opened and closed in a state integral with the associated holder plates 4, thus permitting the software disk to be removed from the case 1 and to be reinserted therein.

Now, an embodiment of the software disk holder which can hold a plurality of software disk cases 1 coupled together in a planar state will be described with reference to FIGS. 1 to 5 and 9 to 11.

The holder, as illustrated, comprises a plurality of holder plates 4, each of which is overlapped over the bottom of the case body 2 of a respective software disk case 1. Each plate 4 comprises upper case coupling means 5 like that described before, to be coupled to and un-coupled from the respective case body 2. Further, each plate of comprises first side plate coupling means 7 to be coupled to and un-coupled from a holder plate 4 holding a front or rear adjacent software disk case 1 and second side plate coupling means 8 to be coupled to and un-coupled from the holder plate 4 holding a left or right side adjacent software disk case 1.

Figure 10:
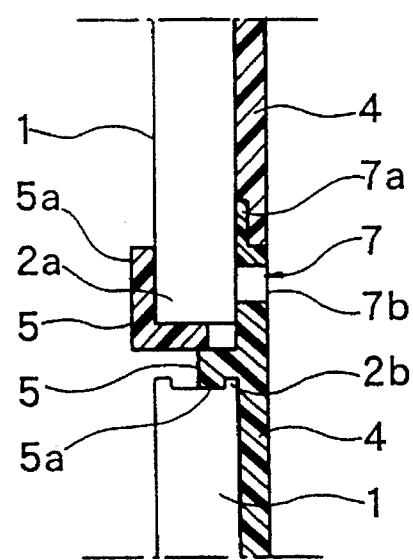
FIG. 10 is a sectional view taken along line X—X in FIG. 9.
Figure 11:
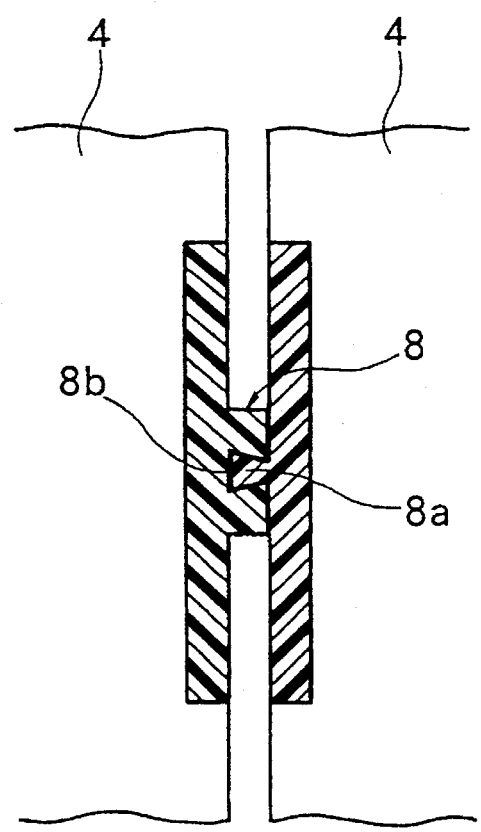
FIG. 11 is a sectional view showing second side plate coupling means.

As shown in FIGS. 10 and 11, in a portion of the first side plate coupling means 7 which is formed on the front end of the holder plate 4, engagement protuberances 7a protruding from the front end of the plate are engaged in engagement recesses or holes 7b formed in the front adjacent holder plate 4 adjacent the rear end thereof. The other portion of the first side plate coupling means 7 which is formed on the rear end of the holder plate 4, is constituted by engagement recesses or holes 7b, in which engagement protuberances 7a protruding from the front end of the rear adjacent holder plate 4 are engaged.

In the second side plate coupling means 8, dovetail or key protuberances 8a formed on either left or right end of the plate 4 are engaged in key grooves 8b formed in the corresponding side adjacent holder plate 4 adjacent the corresponding end thereof. Also, in key grooves 8b formed in the plate 4 adjacent the other end are to be engaged key protuberances 8a formed on the associated end of the corresponding side adjacent holder plate 4.

Figure 9:
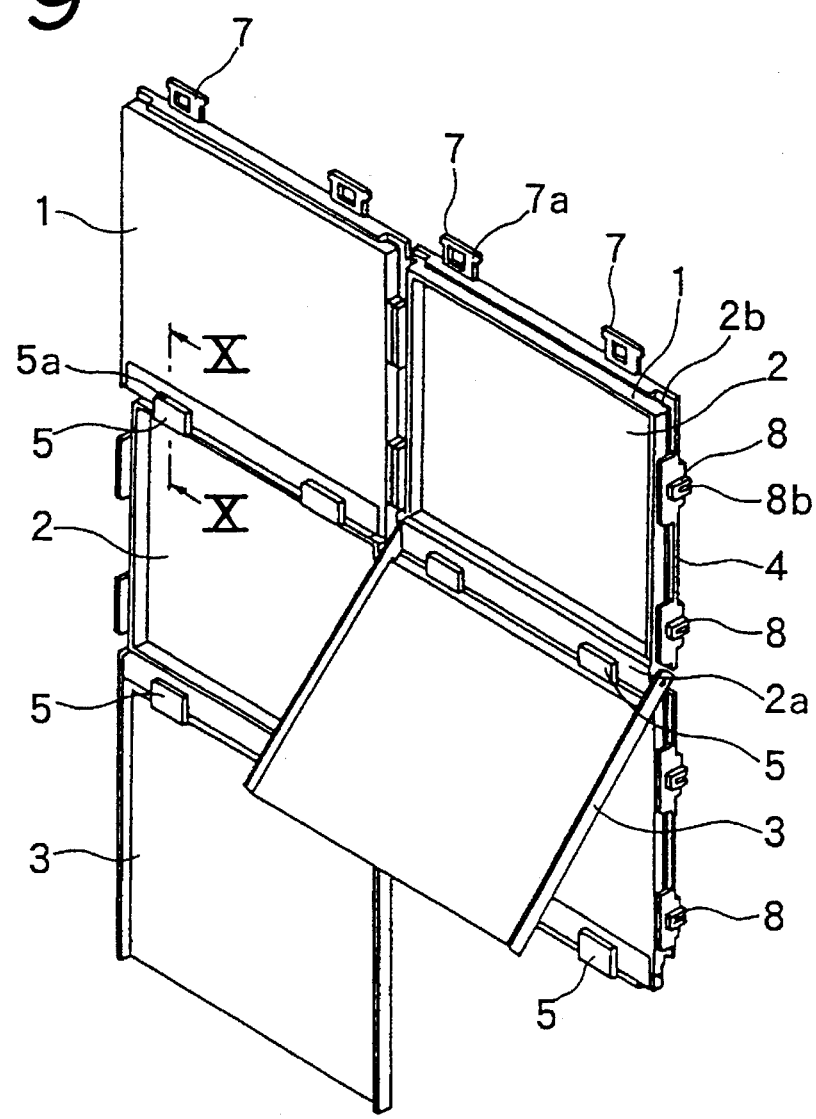
FIG. 9 is a perspective view showing a different embodiment of the software disk holder holding a plurality of software disk cases coupled together in a planar state.

As shown in FIG. 9, each holder plate 4 is overlapped over and coupled to the bottom of each of a plurality of software disk cases 2 and has its first and second side plate coupling means 7 and 8 coupled respectively to the front and rear and to the left and right adjacent holder plates. Thereby, a plurality of software disk cases 1 are coupled together in a planar state such that the lid 3 of each case can be opened and closed to remove and the reinsert a respective software disk.

The above molder plates 4 are each provided with, in addition to the upper and lower case coupling means 5 and 6, the first and second side plate coupling means 7 and 8, thereby to permit a plurality of software disk cases 1 to be coupled together either in an overlapped fashion or in a planar fashion, However, it is of course possible to separately provide holders which have only the upper and lower case coupling means 5 and 6 and other holders which have only the first and second plate coupling means 7 and 8.

As has been shown, according to the invention it is readily possible to obtain overlapped coupling of a plurality of software disk cases by providing holder plates between adjacent ones of the software disk cases and coupling the upper and lower case coupling means of each plate to the case body of the upper case and to the lid of the lower case, respectively. In addition, the lid of each case can be opened and closed together with the associated holder plate for removing and and then reinserting the respective software disk.

Further, the holder permits a desired amount of software disk cases to be coupled without restriction in an overlapped state. It is thus possible to ensure convenient maneuverability when the holder is carried and also to permit a software disk to be taken out and accommodated again quickly.

Further, the holder permits a desired amount of software disk cases to be filed such that the cases are coupled together either in an overlapped state or in a planar state.

What is claimed is:

1. An assembly comprising:
    a plurality of software disk cases, each said case including a case body and a lid hinged thereto;
    a disk holder including a plurality of separate holder plates;
    said cases and said plates being oriented in stacked and overlapped relationship relative to each other and with each said plate being interposed between a respective upper said case and a respective lower said case,
    each said plate having upper case coupling structure removably coupled to said case body of said respective upper case and lower case coupling structure removably coupled to said lid of said respective lower case; and
    each said plate being free of direct connection to an adjacent stacked said plate.

2. An assembly as claimed in claim 1, wherein each said case and each said plate has a rectangular configuration defined by a first pair and a second pair of opposed lateral edges, said upper case coupling structure of each said plate is at said first pair of opposed lateral edges thereof and is coupled to the case body of said respective upper case at said first pair of opposed lateral edges thereof, and said lower case coupling structure of each said plate is at said second pair of opposed lateral edges thereof and is coupled to the lid of said respective lower case at said second pair of opposed lateral edges thereof.

3. An assembly as claimed in claim 2, wherein each said plate further includes first side plate coupling structure to be releasably coupled to additional said plates to be located adjacent at least one of the front and rear lateral edges of said each plate, and second side plate coupling structure to be releasably coupled to additional said plates to be located adjacent at least one of the left and right lateral edges of said each plate.

4. An assembly as claimed in claim 3, wherein said first pair of opposed lateral edges comprise said front and rear lateral edges, and said second pair of opposed lateral edges comprise said left and right lateral edges.

5. An assembly as claimed in claim 3, wherein coupling movement of said first and second side plate coupling structure is in a direction perpendicular to a plane of said each plate.

6. An assembly as claimed in claim 1, wherein each said plate further includes first side plate coupling structure to be releasably coupled to additional said plates to be located adjacent at least one of the left and rear lateral edges of said each plate, and second side plate coupling structure to be releasably coupled to additional said plates to be located adjacent at least one of the left and right lateral edges of said each plate.

7. An assembly as claimed in claim 6, wherein coupling movement of said first and second side plate coupling structure is in a direction perpendicular to a plane of said each plate.

8. An assembly comprising:
    a plurality of software disk cases, each said case having a rectangular, flattened planar configuration, and each said case including a case body and a lid hinged thereto;
    a disk holder including a plurality of separate holder plates, each said plate having a planar, rectangular configuration defined by opposed front and rear lateral edges and opposed left and right lateral edges;
    said plates being oriented in a coplanar alignment with respective said lateral edges thereof confronting each other;
    said cases being oriented such that a bottom of said case body of each said case is stacked on and overlaps an upper surface of a respective said plate, such that said cases are oriented in a coplanar alignment above and parallel to said coplanar alignment of said plates;
    each said plate having upper case coupling structure removably coupled to said case body of a respective said case, such that said lid of said respective case is hingedly openably movable in a direction away from said case body and said each plate; and
    each said plate having first side plate coupling structure releasably coupled to other said plates located adjacent said at least one of the left and rear lateral edges of said each plate, and second side plate coupling structure releasably coupled to other said plates located adjacent said left or right lateral edges of said each plate.

9. An assembly as claimed in claim 8, wherein coupling movement of said first and second side plate coupling structure is in a direction perpendicular to said coplanar alignment of said plates.

10. A disk holder comprising:
    a plurality of separate holder plates, each said plate having a planar, rectangular configuration defined by opposed front and rear lateral edges and opposed left and right lateral edges;
    said plates being oriented in a coplanar-alignment with said lateral edges of adjacent plates confronting each other;
    each said plate having upper case coupling structure to be removably coupled to a case body of a respective software disk case, such that a lid of the respective case would be hingedly openably movable in a direction away from the-case body and said each plate; and
    each said plate having first side plate coupling structure releasably coupled to other said plates located adjacent at least one of said front and rear lateral edges of said each plate, and second side plate coupling structure releasably coupled to other said plates located adjacent at least one of said left and right lateral edges of said each plate.

11. A disk holder as claimed in claim 10, wherein coupling movement of said first and second side plate coupling structure is in a direction perpendicular to said coplanar alignment of said plates.

12. A holder plate to be employed with other similar holder plates to provide accessible storage of software disk cases including case bodies with lids hinged thereto, said holder plate comprising:
    a member having a planar rectangular configuration defined by first and second pairs of opposed lateral edges and opposite upper and lower surfaces;
    upper case coupling structure at said first opposed pair of lateral edges and extending upwardly and outwardly away from said upper surface to be releasably coupled to a case body of a case to be stacked on said upper surface;

lower case coupling structure at said second pair of opposed lateral edges and extending downwardly and outwardly away from said lower surface to be releasably coupled to a lid of a case to be stacked on said lower surface;

first side plate coupling structure to be releasably coupled to additional plates to be located adjacent at least one of the front and rear lateral edges of said member; and second side plate coupling structure to be releasably coupled to additional plates to be located adjacent at least one of the left and right lateral edges of said member.

13. An assembly as claimed in claim 12, wherein said first pair of opposed lateral edges comprise said front and rear lateral edges, and said second pair of opposed lateral edges comprise said left and right lateral edges.

* * * * *